United States Patent
Cucheran et al.

[19]

[11] Patent Number: 5,855,840
[45] Date of Patent: Jan. 5, 1999

[54] ONE-PIECE END SUPPORT AND METHOD OF FORMING THEREOF

[75] Inventors: John S. Cucheran, Lake Orion; John Michael Heuchert, Macomb, both of Mich.

[73] Assignee: JAC Products, Inc., Ann Arbor, Mich.

[21] Appl. No.: 840,673

[22] Filed: Apr. 29, 1997

Related U.S. Application Data

[60] Division of Ser. No. 638,167, Apr. 26, 1996, Pat. No. 5,765,737, which is a continuation-in-part of Ser. No. 497,208, Jun. 30, 1995, Pat. No. 5,622,298.

[51] Int. Cl.$^6$ .................................................. B29C 45/00
[52] U.S. Cl. .......................................... 264/572; 224/326
[58] Field of Search ............................. 264/572; 224/326

[56] References Cited

U.S. PATENT DOCUMENTS

| | | |
|---|---|---|
| 3,724,730 | 4/1973 | Olsen et al. . |
| 4,342,411 | 8/1982 | Bott . |
| 5,069,377 | 12/1991 | Baughman . |
| 5,207,366 | 5/1993 | Cucheran ................................. 224/326 |
| 5,262,105 | 11/1993 | Komiyama et al. .................... 264/572 |
| 5,470,003 | 11/1995 | Cucheran . |
| 5,622,298 | 4/1997 | Cucheran et al. ....................... 224/326 |
| 5,635,117 | 6/1997 | Fujioka et al. ........................... 264/572 |

*Primary Examiner*—Catherine Timm
*Attorney, Agent, or Firm*—Harness, Dickey & Pierce, PLC

[57] ABSTRACT

A vehicle article carrier having a pair of one-piece, integrally formed side rail members. Each side rail member has a side rail portion and a pair of end supports integrally formed with terminal ends of the side rail portion. The side rail portion includes a hollow area formed therein and extending along the entire length of the side rail portion. Each end support further includes an inaccessible hollow portion in communication with the hollow portion formed in the side rail portion. Each side rail member forms a lightweight yet rigid member which does not require molding lines, seams or other markings on any portion of the outer surface which is clearly visible to an observer once the side rail members are mounted on an outer body surface of a vehicle. The cost of manufacture is also reduced because the number of molding tools needed to manufacture the side rail member is reduced, as is the complexity and time to assemble the side rail members to an outer body surface of a vehicle. The method of manufacture of the invention further permits the side rail portions of the side rail members to be formed with varying shapes and functional features which would not be possible with conventional roll forming and extrusion techniques.

3 Claims, 5 Drawing Sheets

FIG 11

ONE-PIECE END SUPPORT AND METHOD OF FORMING THEREOF

CROSS REFERENCE TO RELATED APPLICATIONS

This is a division of U.S. patent application Ser. No. 08/638,167, filed Apr. 26, 1996 now U.S. Pat. No. 5,765,737 which is a continuation in part of U.S. Ser. No. 08/497,208, filed Jun. 30, 1995, presently U.S. Pat. No. 5,622,298 issued Apr. 22, 1997.

TECHNICAL FIELD

This invention relates to vehicle article carriers, and more particularly to a one-piece, integrally formed side rail member for a vehicle article carrier.

DISCUSSION

Vehicle article carriers are used in a wide-variety of applications to support luggage securely atop an outer body surface of a vehicle such as a roof or deck lid of the vehicle. Such vehicle article carriers typically have an aerodynamic design and include a pair of side rail assemblies which are each secured directly to the outer body surface of a vehicle. Each side rail assembly typically includes a pair of end supports which are coupled to a side rail component at opposite ends of the side rail component. Each end support serves to support the side rail component above the outer body surface. Thus, each conventional side rail assembly forms a multi-piece component with several independent parts which must be manufactured separately and assembled prior to, or during, installation of the side rail component on a vehicle.

The end supports of conventional vehicle article carriers have also typically been constructed as multi-piece subcomponents. This has been necessitated in part by limits in manufacturing technology when molding complex aerodynamic end support designs. A first piece is typically formed through well-known molding techniques with apertures or bosses formed therewith adapted to engage or interlock with an independent second piece. The second piece is most typically in the form of a cover which provides the end support with a finished, solid looking appearance. Typically, the cover is secured to the first piece via a plurality of threaded fastening elements or bosses which lockably secure the second piece to the apertures or bosses of the first piece. While some one-piece supports are presently manufacturable, these supports are limited to simple shapes and designs. Such existing, simple design one-piece supports are presently available from the assignee of the present application.

Each end support is typically coupled to one end of a side rail member by external fastening elements or other means such that the side rail member is supported entirely above the outer body surface of the vehicle. As such, the side rail member typically requires its own tooling if same is to be injection molded.

While prior developed side rail assemblies have proven generally satisfactory in terms of strength and durability, it would nevertheless be more desirable from a manufacturing cost standpoint to be able to manufacture an aerodynamic, complexly shaped side rail, including the two end supports thereof, as a one-piece, integrally formed component. This would significantly reduce the manufacturing cost by reducing the tooling necessary to form three or more independent components (i.e., two end supports, each having a cover portion, and a side rail member). It would also reduce manufacturing costs by eliminating two or more manufacturing steps, those steps being the physical securing of the second piece to the first piece to form each end support and the securing of each end support to the side rail member. A one-piece, molded side rail would further be desirable from an aesthetic standpoint because the side rail portion could be molded so as to have a slightly varying shape (e.g., increasing in width or height from front to rear), or other features such as integrally formed center supports and/or integrally formed mounting portions for a pair of cross bars. In some instances, a one-piece side rail could be desirable if same could be manufactured without the appearance of seams or other forms of connecting lines visible when viewing the exterior surfaces of the side rail. Finally, a one-piece side rail would provide even greater strength and resistance to torsional stresses than most multi-piece end supports.

Accordingly, it is a principal object of the present invention to provide a one-piece side rail member for a vehicle article carrier which is adapted to be readily secured to an outer body vehicle surface, and which is integrally formed as a single-piece component having no visible seams or other molding lines apparent when viewing its exterior surface.

It is still another object of the present invention to provide a method for forming a one-piece side rail member in which a plurality of molding tools are used in connection with a molding process to form a side rail component having a single-piece construction which does not include any molding lines visible from the exterior surface of the end support.

It is still another object of the present invention to provide a one-piece side rail component and a method of forming same which reduces the overall cost of the side rail component by reducing the number of manufacturing steps required to manufacture the end support in addition to reducing the molding tooling required to produce the end support.

SUMMARY OF THE INVENTION

The above and other objects are provided by a one-piece side rail member and method of forming same in accordance with the preferred embodiments of the present invention. The apparatus of the present invention comprises a one-piece side rail member which includes an elongated side rail portion and a pair of end supports formed integrally therewith. Each end support includes a main body portion and a bottom portion. The main body portion generally includes an end portion and a central portion. The end portion and central portion form a gradually upwardly sloping aerodynamic profile which is aesthetically appealing as well as functionally desirable in minimizing wind, noise and turbulence when the vehicle is moving. The end portion of each end support blends in gradually with an associated terminal end portion of the side rail member without the presence of visible molding lines, seams or other marks at the junctions of these three components. The side rail member and end supports thus form a single-piece component which may be manufactured from a single injection molding tool. The single piece side rail member is also more easily and quickly assembled to the outer body surface of a vehicle than conventional multi-piece side rail assemblies.

In the preferred embodiments, the bottom portion of each end support includes at least one aperture for allowing a conventional fastening element such as a threaded fastener to be positioned therethrough. The fastener enables the bottom portion to be fastened to an outer body surface of the vehicle upon which the end support is mounted. The main body portion and bottom portion are integrally formed as a single-piece component and thus do not include any seams or other connecting lines which are visible when the end support is attached to the outer body surface of the vehicle, such as would be the case with prior manufactured two-piece end supports.

The side rail portion may optionally be formed with a channel, such as a U-shaped channel, extending at least a portion of the length thereof. The channel could be used to support a portion of a cross bar operably coupled to the channel via suitable hardware such that the cross bar can be adjustably positioned at a desired point along the side rail portion. For even further strength, an optional metal channel insert can be inserted into the channel when a cross bar is to be used with the side rail member. The side rail member need not include any visible seams or connecting lines at the areas where the side rail portion merges into each end support. Such seams or connecting lines could obviously be formed if desired for aesthetic purposes.

The method of the present invention involves using a molding tool having at least a first molding tool portion and a second molding tool portion to define a molding cavity into which molten plastic is injected. The first and second molding tool portions are urged towards each other to form a molding cavity, and subsequently a predetermined quantity of molten plastic is injected into the molding cavity. In one preferred embodiment a pressurized fluid is then injected into the molding cavity which forces the molten plastic against inner surfaces of each of the first and second molding tools. After a predetermined period of time the fluid pressure is removed from the molding cavity and the first and second molding tools separated, thus revealing the one-piece side rail member. In a preferred embodiment, a third molding tool portion is incorporated and moved towards the first and second molding tool portions, as the first and second tool portions are urged towards each other prior to injecting the molten plastic into the molding cavity.

In one preferred embodiment, each end support includes a central opening formed in the central portion, with the bottom portion including a recessed undersurface. In this preferred embodiment, the bottom portion forms a base which protrudes laterally of the central portion. The one-piece side rail member thus forms an aesthetically appealing component which is less expensive to manufacture than previously manufactured side rails due to the requirement of less tooling and fewer assembly steps.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
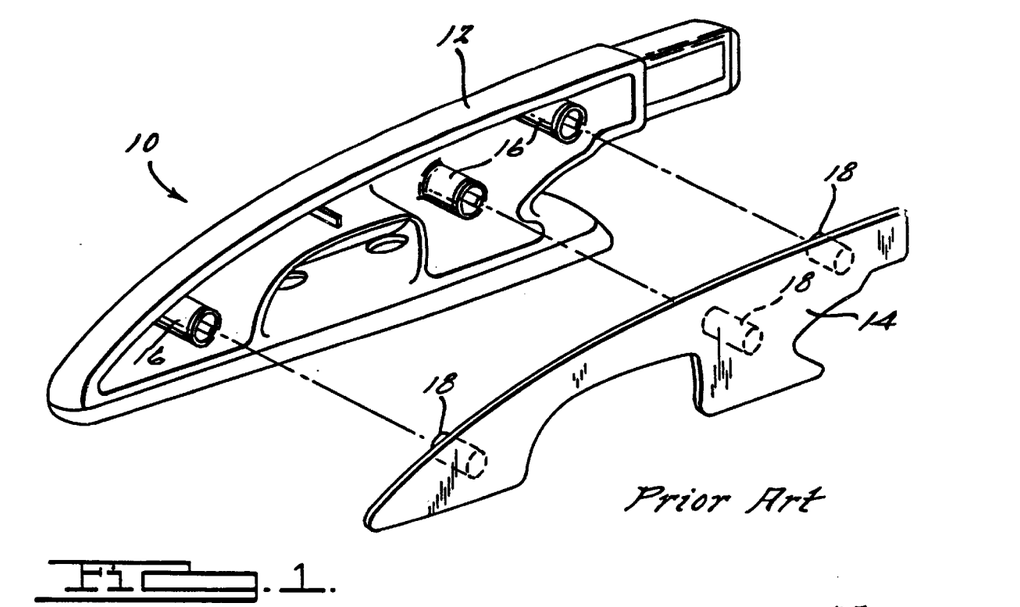
FIG. 1 is a perspective view of a two-piece prior art end support.

Referring to FIG. 1, there is shown a conventional prior art two-piece end support 10. The end support 10 generally includes a first component piece 12 and a second component piece 14. The first component piece 12 typically includes a plurality of integrally formed bosses 16, and the second component piece 14 typically includes a corresponding plurality of studs 18 integrally formed therewith. The second component piece 14 forms a cover which is secured to the first component piece 12 by pressing the second piece 14 against the first piece 12 such that the studs 18 engage within the bosses 16 securely. Conventional adhesives may be placed in the bosses 16 to permanently adhere the studs 18 therein. Alternatively, self-tapping threaded fasteners could be used in lieu of the studs 18 to secure the second piece 14 to the first component piece 12.

While the two-piece end support 10 of FIG. 1 has proven satisfactory for use with vehicle article carriers, the two-piece construction does add additional cost and manufacturing complexity into the process of producing the end support. For one, additional molding tooling is required to separately produce the first component piece 12 and the second component piece 14. An additional assembly step is also required to manually secure the second component piece 14 to the first component piece 12. The resulting two-piece end support 10, because of its two-piece construction, includes a clearly visible "seam" where the first and second component pieces 12 and 14, respectively, abut. In some instances, it may also be necessary to seal the seam with some form of sealant to prevent water or moisture from entering the interior area of the end support 10.

Figure 2:
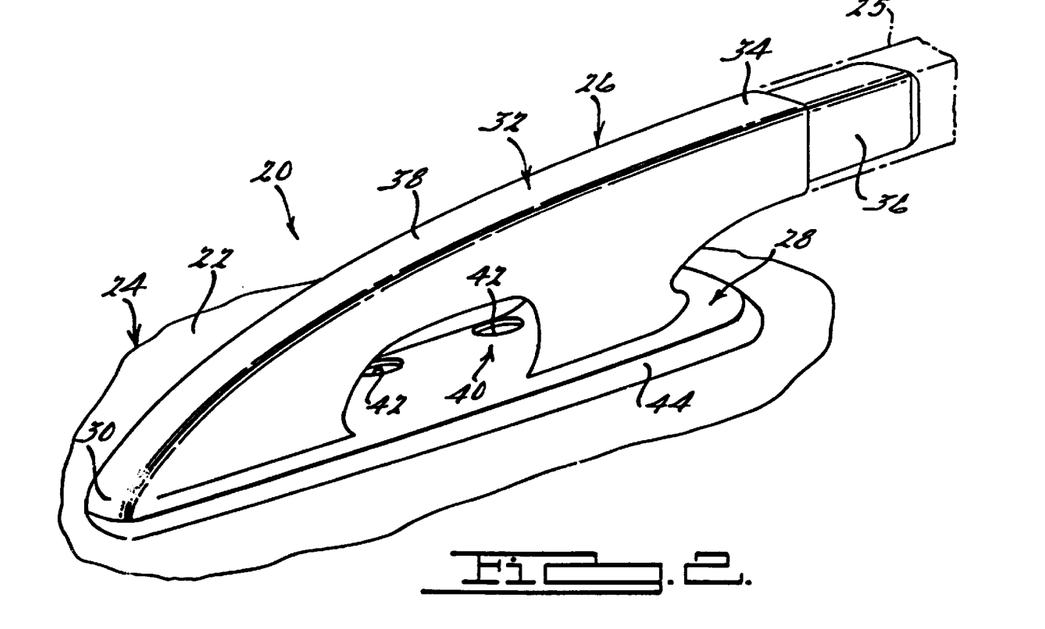
FIG. 2 is a perspective view of a one-piece end support in accordance with a preferred embodiment of the method and apparatus of the present invention.

Referring now to FIG. 2, there is shown a one-piece end support 20 in accordance with a preferred embodiment of the present invention. The end support 20 is adapted to be secured to an outer body surface 22 of a vehicle 24, as will be explained further in the following paragraphs, and to help support an elongated support member 25 (shown in phantom) above the outer body surface 22.

The end support 20 includes a main body portion 26 and a bottom portion 28. The main body portion 26 generally is comprised of an end portion 30, a central portion 32 and a neck portion 34. The neck portion 34 includes a protruding supporting member 36 projecting outwardly therefrom. The end portion 30, central portion 32 and neck portion 34 together form an aerodynamic, gradually upwardly curving upper/outer surface 38, which significantly helps reduce wind noise and adds to the aesthetic appeal of the end support 20.

In the preferred embodiment, the central portion 32 further includes an opening 40 somewhat in the form of an oval. The opening 40 provides even further aesthetic appeal to the end support 20, as well as reducing the amount of material required to construct the end support 20.

With further regard to FIG. 2, the bottom portion 28 has a pair of apertures 42 which allow a conventional threaded fastening element (not shown) to be used to secure the bottom portion 28 to the outer body vehicle surface 22. The bottom portion 28 is preferably constructed so as to flare outwardly slightly of the main body portion 26 to provide additional lateral stability to the end support 20 when the end support is mounted to the outer body vehicle surface 22. In the preferred embodiment, the bottom portion 28 includes a tapered edge 44 which provides an additional degree of aesthetic appeal to the end support 20 and helps the bottom portion 28 blend in more gradually to the outer body vehicle surface 22.

Figure 7:
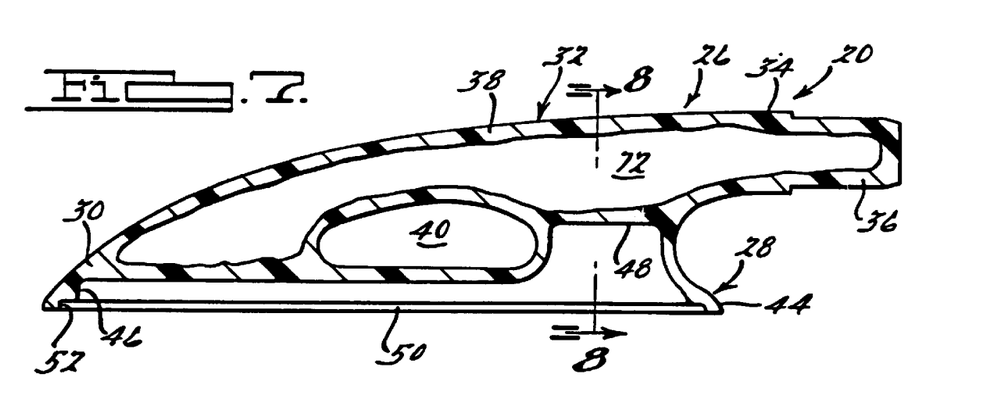
FIG. 7 is a cross-sectional side view of the finished one-piece end support in accordance with section line 7—7 in FIG. 6.
Figure 8:
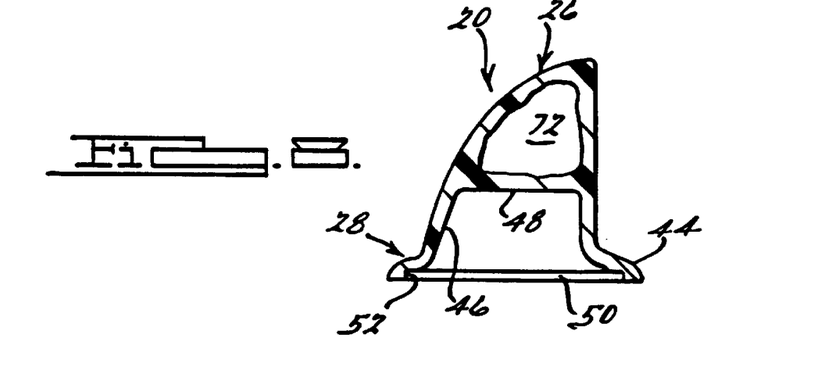
FIG. 8 is an end cross-sectional view of the one-piece end support of FIG. 7 taken in accordance with section line 8—8 in FIG. 7.

With brief reference to FIGS. 7 and 8, the bottom portion 28 further includes a recessed undersurface 46 formed in part by a lower support wall 48. An optional gasket or other like component 50 may be included and sized to fit within a recessed shoulder portion area 52 integrally formed in the tapered edge portion 44.

Figure 3:
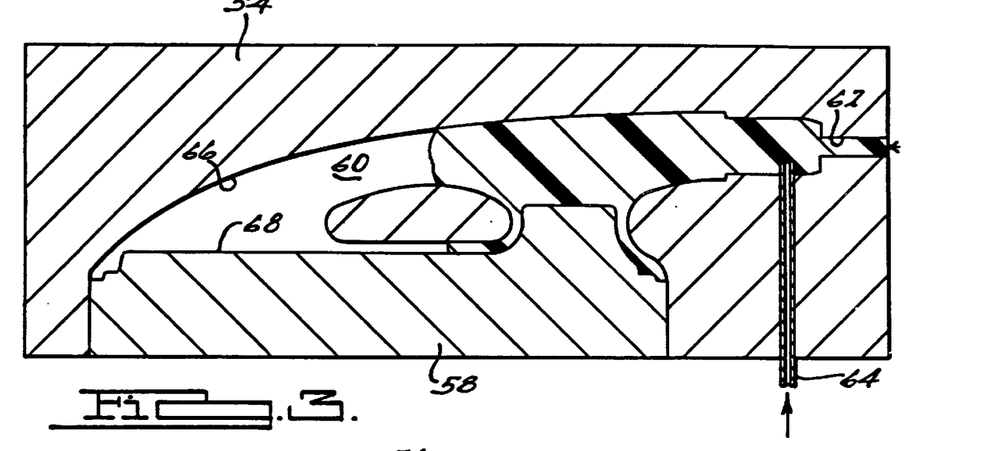
FIG. 3 is a cross-sectional side view of two of the three molding tools used to produce the one-piece end support, and further showing a quantity of molten plastic injected in the molding cavity formed in part by the two molding tools.

Referring now to FIG. 3, the method of forming the end support 20 will be described. With brief reference to FIG. 6, three molding tools 54, 56 and 58 are moved towards each other to form a molding cavity 60 as shown in FIG. 3. From FIG. 3, it will be appreciated, however, that the molding tool 56 is not visible in order to illustrate the molding cavity 60.

With further reference to FIG. 3, once the three molding components 54, 56 and 58 are urged towards each other into abutting contact with each other, a molten thermal plastic such as polyvinylchloride (PVC) is injected through an opening 62 formed by semi-circular openings in surface portions of the molding tools 54 and 56. Once a predetermined quantity of the molten thermal plastic has been injected into the molding cavity 60, a pressurized fluid is injected through a gas-injection tube 64 extending through the molds 54 and 56. The pressurized fluid injected through the gas-injection tube 64 urges the molten thermal plastic outwardly against the inner surface walls 66 and 68 of the molding tools 54 and 58, respectively, and an inner surface 70 (FIG. 6) of the second molding tool 56.

Figure 4:
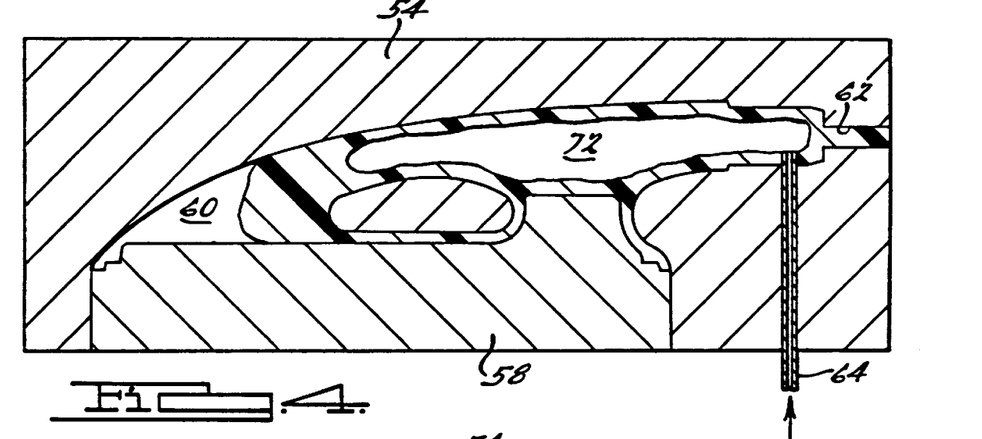
FIG. 4 shows the interior walls of the molding cavity in FIG. 3 being covered by the molten plastic as a gas is injected through one of the molding tools.
Figure 5:
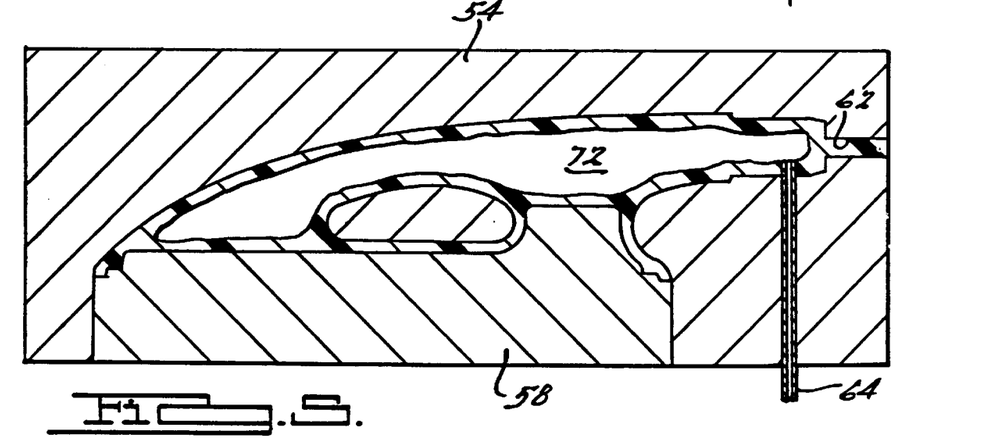
FIG. 5 shows the molding cavity interior walls completely covered by the molten plastic to form the one-piece end support.
Figure 6:
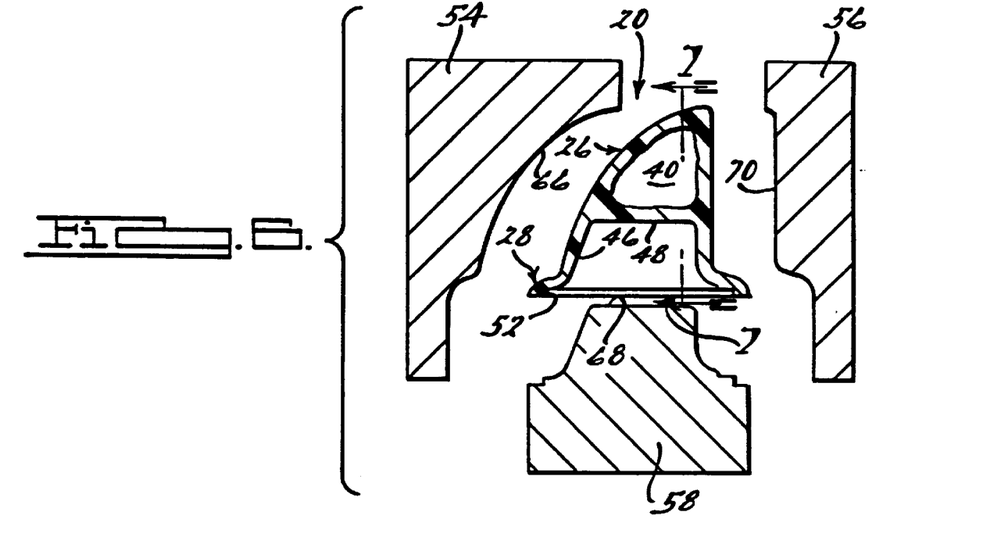
FIG. 6 is an end view of the molding tools shown in FIGS. 3–5 together with a third molding tool, all urged away from the finished one-piece end support.

From FIGS. 3–5, it can be seen how the pressurized fluid injected through the gas-injection tube 64 urges the quantity of molten thermal plastic throughout the molding cavity 60 so as to form a hollow interior portion 72 shown in FIG. 5. After a predetermined period of time, the fluid pressure is removed and the molten thermal plastic is given a predetermined period of time in which to cool. The three molding tools 54, 56 and 58 are then drawn apart from one another to reveal the finished end support 20, as shown in FIG. 6. The above molding steps may be accomplished with conventional, suitable injection molding equipment.

The molten thermal plastic may be comprised of PVC or a wide-variety of thermal plastics, provided same can be readily injection molded and provide good strength and structural rigidity. The finished end support 20, shown in FIGS. 2, 7 and 8, is relatively light-weight, yet structurally strong. The end support 20, since it is molded as a single-piece component, requires less molding tooling than what otherwise would be required for a two-piece end support, is stronger than a two-piece end support, resists torsional twisting forces better than a two-piece end support and does not require any further assembly steps once the molded part is removed from the mold tooling 54, 56 and 58. This is contrary to conventional two-piece end supports which still require the cover 14 (FIG. 1) to be physically secured to the first component piece 12. It will, therefore, be appreciated that the end support 20 forms an aesthetically appealing end support having no visible seams which would otherwise detract from its aesthetic appeal, and yet is more economical and simple to manufacture than two-piece end supports.

An additional advantage is that a one-piece end support is easier to remove from molding tooling than the two components of a two-piece support. This is because a two-piece support can tend to twist slightly as it is removed from the molding tooling, thus slightly distorting its shape. The one-piece end support of the present invention, having greater structural strength due to its one-piece design, resists such twisting forces as the support is removed from molding tooling.

Figure 9:
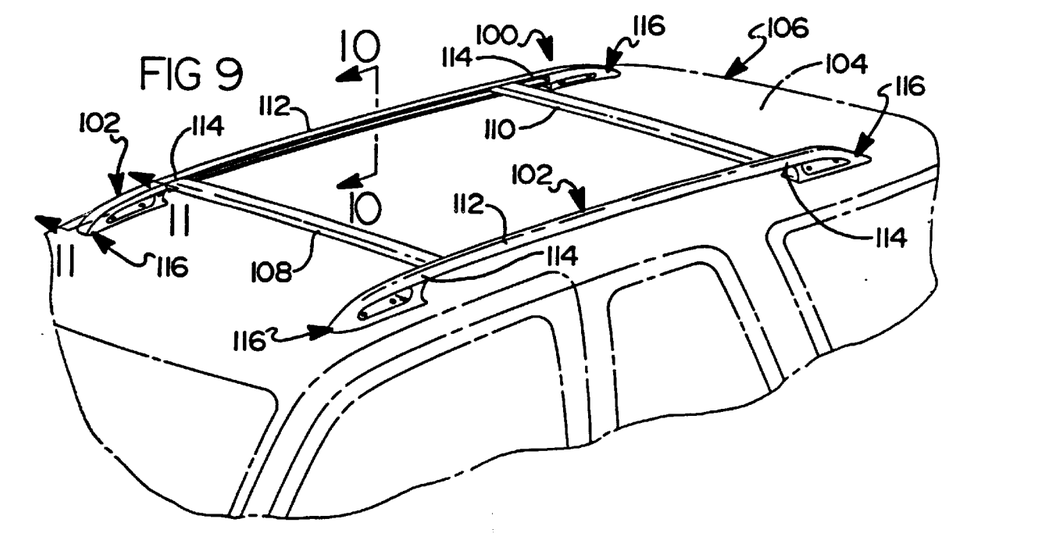
FIG. 9 is a perspective view of a portion of a vehicle showing a vehicle article carrier incorporating the one-piece side rail members of the present invention secured to the outer body surface of the vehicle.

Referring now to FIG. 9, there is shown a vehicle article carrier 100 in accordance with an alternative preferred embodiment on the present invention. The vehicle article carrier 100 includes a pair of one-piece, integrally formed side rail members 102 which are each secured fixedly to an outer body surface 104 of a vehicle 106. It should be appreciated immediately that while the vehicle article carrier 100 of the present invention is shown secured to a roof portion of the vehicle 106, that the vehicle article carrier 100 could easily be secured to a deck lid or other portion of a vehicle with little or no modification.

With further reference to FIG. 9, the vehicle article carrier 100 includes a pair of optional cross bars 108 and 110. The cross bars 108 and 110 could be secured fixedly to the side rail members 102 such that neither cross bar is movable relative to the side rail members 102. Alternatively, and more preferably, one or the other of the cross bars 108 or 110 is movably secured to the side rail members 102 such that it can be adjustably positioned along at least a portion of the length of each side rail member 102 to better adapt the vehicle article carrier for use with articles of varying sizes and shapes. Still further, both cross bars 108 and 110 could be mounted to the side rail members 102 so as to be movable longitudinally along the side rail members.

Figure 10:
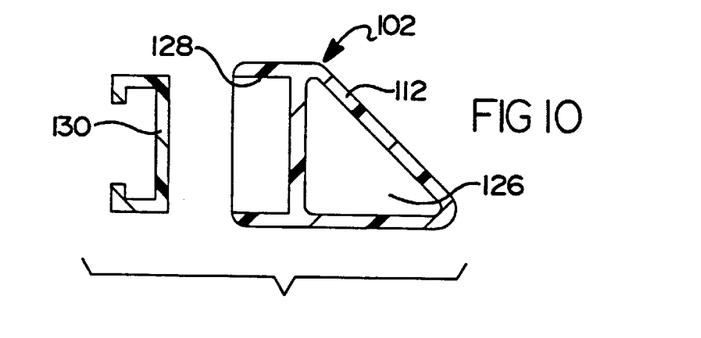
FIG. 10 is a cross-sectional view in accordance with section line 10—10 in FIG. 9 of one of the one-piece side rail members.

With reference to FIG. 10, the construction of one of the side rail members 102 will now be described. It should be appreciated that the side rail members 102 are constructed as mirror images of each other. As such, when two side rail members 102 are to be secured to the outer body surface 104 of the vehicle 106, one of the side rail members 102 is manufactured such that it is to be installed on the driver's side of the vehicle 106 while the other one of the side rail members 102 is adapted to be secured on the passenger side. If one or more cross bars are to be used with the vehicle article carrier 100, then the side rail members 102 are secured to the outer body surface 104 at a distance apart from one another sufficient to enable the cross bar 108 or 110 to be secured therebetween. The side rail members 102 preferably extend generally parallel to one another lengthwise along the vehicle from front to rear of the vehicle.

With further reference to FIG. 9, each side rail member 102 includes an elongated side rail portion 112 having terminal end portions 114. Integrally formed with the side rail portion 112 at each terminal end portion 114 is a one-piece end support 116. Together, the one-piece end supports 116 and the side rail portion 112 form a single, integrally formed component which is structurally strong, light weight and which can be manufactured without visible molding seams, connecting lines or other visually identifiable markings, if desired, at the areas where the end supports 116 blend into the terminal end portions 114 of the side rail portion 112.

Figure 11:
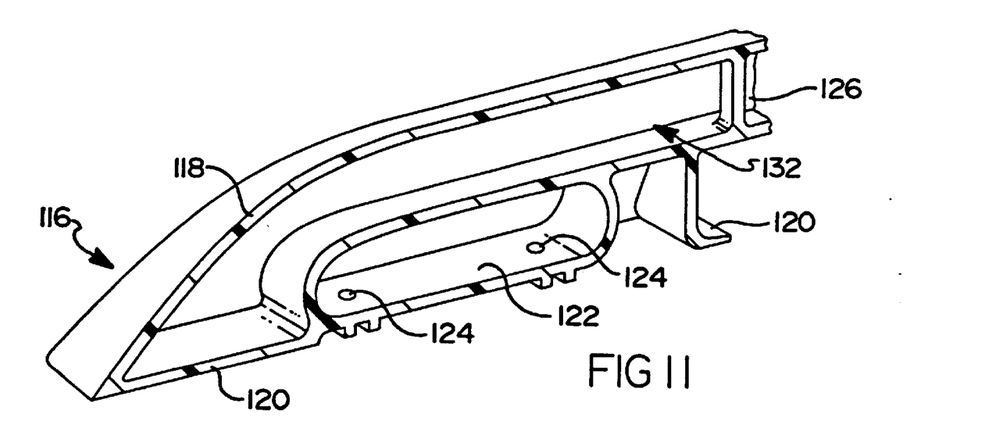
FIG. 11 is a perspective, cross-sectional view in accordance with section line 11—11 in FIG. 9 of an end support of one of the side rail members.

With reference to FIG. 11, each end support 116 includes a central portion 118 and a bottom portion 120. An opening 122 is formed in the central portion 118. The bottom portion 120 includes one or more apertures 124 in communication with the opening 122 which permit conventional external fastening elements (not shown) to be used to secure the end supports 116 to the outer body surface 104 of the vehicle 106.

Referring to FIG. 10, the side rail portion 112 includes a hollow area 126 formed therein during the manufacture of the side rail member 102. The hollow area 126 extends preferably along the entire length of the side rail portion 112 and into communication with an interior area of each end support 116.

In the preferred embodiment the side rail portion 112 further includes an integrally formed, U-shaped channel 128 extending along at least a portion of the length thereof, and preferably along substantially the entire length of the side rail portion 112. Optionally, the U-shaped channel 128 could accommodate an external, metal or plastic channel member 130 for added strength and for better enabling one or both of the cross bars 108 and 110 to be secured adjustably to the side rail member 102. It will be appreciated that forming the hollow area 126 serves to reduce the amount of plastic required to mold the side rail portion 112 and reduce the overall weight of the side rail member 102.

Referring to FIG. 11, the end support 116 can be seen to include an inaccessible hollow portion 132 adjacent the hollow area 126 formed in the side rail portion 112. The hollow portion 132 is in communication with the hollow area 126 of each end support. It can also be seen that the end support 116 is aerodynamically shaped so as to gradually curve upwardly from the bottom member 120 and to blend into, or put differently, merge into, the side rail portion 112 without the need for visually identifiable seams, connecting lines or other marks at the points where the side rail portion 112 merges into the end supports 116.

Figure 12:
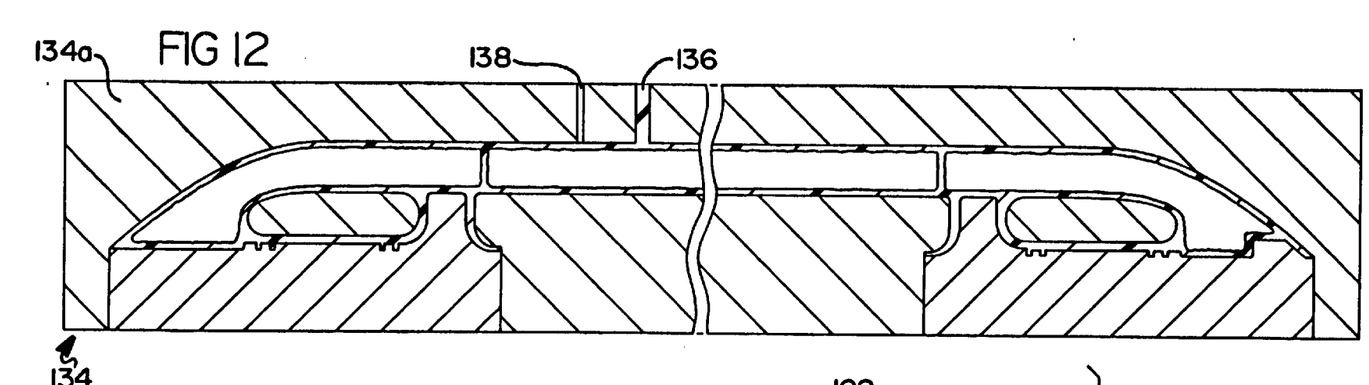
FIG. 12 is a cross-sectional view of two components of a three component molding tool used to manufacture the one-piece side rail, and showing molten plastic being injected into the two tool components.

Referring now to FIG. 12, a molding tool 134 is shown for manufacturing the one-piece side rail member 102. Molding tool 134 includes a first tool portion 134a and a second tool portion 134b. The first tool portion 134a is preferably formed so as to include at least one port 136 for injecting plastic into the tool and a port 138 for injecting a fluid into the tool 134 so as to force the plastic outwardly along the interior surfaces of the tool. It will be appreciated, however, that some molding techniques will not require the assistance of liquid injection to aid in the formation of the side rail member 102. Accordingly, the illustration of liquid injection port 138 will be understood to be optional. With brief reference to FIG. 13, a third molding tool portion 134c completes the molding tool 134.

Figure 13:
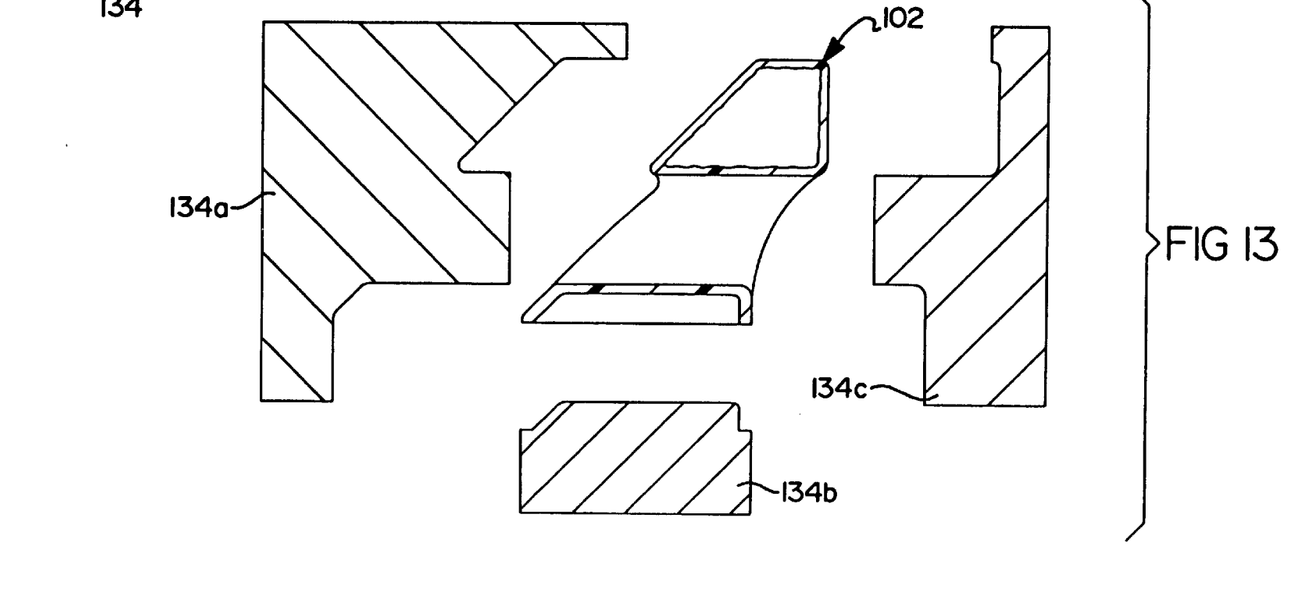
FIG. 13 is a cross-sectional view of a portion of the end support of the one-piece side rail after the three molding tool components have been removed.

In forming the one-piece side rail member 102, molten plastic is injected into the port 136 and a fluid under high pressure is injected into port 138, in accordance with conventional injection gas assisted injection molding techniques. The fluid entering through port 134 forces the molten plastic against the interior surfaces of the mold tools 134a–134c to form the one-piece side rail member 102. The fluid pressure from port 134 is then removed and the molten plastic injected into the tool 134 is allowed to cool for a sufficient time before the three molding tools 134a–134c are separated from one another to allow removal of the completed one-piece side rail member 102. Again, however, the use of pressurized fluid to assist in the molding process is not necessarily essential, depending on the specific molding technique employed.

The one-piece side rail members 102 of the vehicle article carrier 100 form aesthetically pleasing, aerodynamically efficient side rail members which do not require the presence of molding lines, seams, sink marks, etc., which are readily visible to the naked eye when viewing the side rail members 102 once they are secured to the outer body surface 104 of the vehicle 106. Furthermore, the side rail members 102 of the present invention may be manufactured from a single molding tool, thus significantly reducing the overall cost of manufacture of the vehicle article carrier 100. The assembly of the vehicle article carrier 100 is further simplified by forming each side rail member 102 as a single-piece component.

It will also be appreciated that the teachings presented herein also enable one-piece side rail members to be constructed which have side rails portions which vary in shape and/or dimensions along the length thereof. For example, the siderail portion could be formed with an increasing width from front to back to provide a particularly distinct aerodynamic appearance. Such a shape could not be manufactured with conventional roll-forming or extrusion techniques, which could only produce a siderail portion having a continuous, uniform shape along its length.

The method of manufacturing a one-piece side rail member disclosed herein could also be used to add an integrally formed center support section at a mid-point of the length of the siderail portion, and/or one or more integrally formed supports for engaging with one or more fixed cross rails. Still further, an integrally formed rail-like member could be formed along one side of the side rail portion to slidably support an adjustable cross rail. Other manufacturing possibilities include molding studs into the base portions. As will be appreciated, the manufacturing techniques described herein could be used to implement a wide variety of design variations and functional enhancements to a one piece side rail member which would otherwise require several independent manufacturing and/or assembly steps, and which would add tangibly to the overall cost of the side rail member 102.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for forming an aerodynamically shaped one-piece side rail for a vehicle article carrier, said one-piece side rail having an elongated side rail portion having a pair of integrally formed end support portions at opposite ends thereof, and wherein said end support portions are adapted to be secured to an outer body surface of a vehicle for supporting said side rail portion above said outer body surface of said vehicle, said method comprising the steps of:

moving a first molding tool and a second molding tool, each having an interior surface cooperating to define said side rail portion and said end support portions towards each other into engagement with each other so as to at least partially define a cavity representing said side rail portion and said end support portions at each end of said side rail portion;

injecting a molten plastic through an opening formed in at least one of said molding tools into a cavity formed by said interior surfaces therebetween, said molding cavity defining exterior surfaces of said one-piece side rail, such that said molten plastic enters said side rail and said end support portions of said cavity;

injecting a fluid under pressure through a second opening in one of said molding tools to cause said molten plastic to be urged against said side rail portion and said end support portions of said interior surfaces of said cavity to thereby form said one-piece side rail;

removing the supply of said pressurized fluid into said molding cavity after a predetermined period of time;

waiting for said molten plastic to cool;

after said molding plastic has cooled, moving said first and second molding tools away from each other; and removing said one-piece side rail from one of said first and second molding tools.

2. The method of claim 1, further comprising the step of:

moving a third molding tool into contact with said first and second molding tools to form said molding cavity; and urging said third molding tool away from said first and second molding tools after said molten plastic has cooled.

3. A method for forming an aerodynamically shaped one-piece side rail having an elongated side rail portion and an end support portion at each end of said side rail portion for a vehicle article carrier, wherein said end support portions are adapted to be fixedly secured to an outer body surface of said vehicle to support said side rail portion above said outer body surface of said vehicle, said method comprising the steps of:

moving a first molding tool, a second molding tool and a third molding tool towards each other into engagement with each other, said first, second and third molding tools including inner surfaces defining a molding cavity having side rail and end support portions, said molding cavity defining a one-piece side rail having said side rail portion integrally formed with said end support portions at opposite ends thereof, said end support portions being offset from said side rail portion such that said side rail portion is supported above said outer body surface when said end support portions are secured to said outer body surface;

injecting a molten plastic through at least one of said molding tools into said molding side rail and end support portions of said cavity;

injecting a gas under pressure into said molding cavity to urge said molten plastic against said inner surfaces of said side rail and said end support portions of said molding cavity;

removing the supply of said pressurized gas after a predetermined period of time;

allowing said molten plastic to cool; and separating said first, second and third molding tools and removing said one-piece side rail from said molding cavity.

* * * * *